Aug. 6, 1957     A. G. BADE     2,801,548
SPEED REDUCER

Filed Sept. 13, 1951     2 Sheets-Sheet 1

INVENTOR.
*Alfred G. Bade*
BY

ATTORNEY

Aug. 6, 1957 A. G. BADE 2,801,548
SPEED REDUCER
Filed Sept. 13, 1951 2 Sheets-Sheet 2

INVENTOR.
Alfred G. Bade
BY
ATTORNEY

United States Patent Office 2,801,548
Patented Aug. 6, 1957

2,801,548

SPEED REDUCER

Alfred G. Bade, Milwaukee, Wis., assignor to The Falk Corporation, Milwaukee, Wis., a corporation of Wisconsin Application September 13, 1951, Serial No. 246,436

6 Claims. (Cl. 74—421)

This invention relates to speed reducers of a type for direct application to the power input shaft of mechanism to be driven thereby.

Speed reducers of this type ordinarily include a hollow shaft adapted to receive the power input shaft of the driven mechanism, in a manner to derive support therefrom, and to be keyed or otherwise fixed in driving relation therewith. Such devices are also commonly equipped with appropriate linkage through which the housing of the speed reducer may be duly anchored in a manner to sustain the torque reaction imposed thereon during operation. However, as heretofore designed, speed reducers of this type are objectionably noisy and short lived, due to inadquate support of the reduction gears therein, this condition being aggravated by the tendency to wabble under normal operating conditions.

One object of the present invention is to provide a speed reducer possessing the advantages of those of the type above mentioned while avoiding the objections noted.

Other more specific objects and advantages will appear, expressed or implied from the following description of a plurality of embodiments of the present invention.

In the several forms of speed reducer shown, the gearing is contained in a housing 10 having two laterally spaced substantially parallel walls 11 and 12 integrally joined by a peripheral wall 13 to provide a highly rigid structure. The walls 11 and 12 together provide a two-point support for each of a plurality of substantially parallel gear-supporting shafts preferably in a manner to be later described. The housing 10 is further strengthened and stiffened by the provision of two substantially parallel oppositely facing integral mounting pads 14 and 15 extending lengthwise of the housing at opposite sides thereof.

Figure 1:
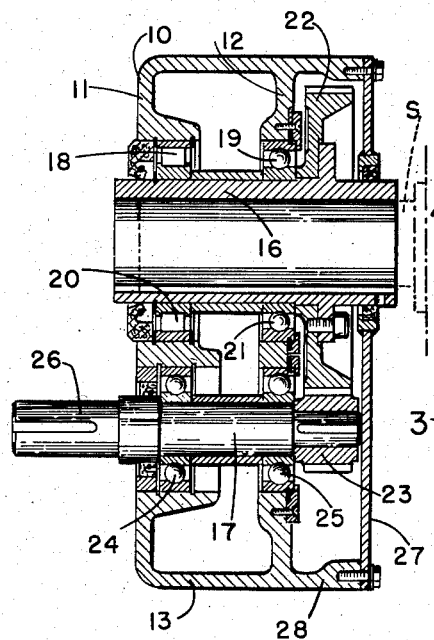
Figure 1 is a longitudinal sectional view of a speed reducer constructed in accordance with the present invention and equipped with a single speed reduction gear train.

The speed reducer shown in Fig. 1 includes two shafts 16 and 17. Shaft 16 is hollow to receive the power input shaft S of the driven mechanism, and preferably of a size to fit the shaft S for support thereby. The shaft 16 is adapted to be keyed or otherwise attached to the shaft S for rotation therewith. The shaft 16 is shown journaled in longitudinally spaced bearings 18 and 19 respectively fixed in suitable coaxial bores 20 and 21, formed in the housing walls 11 and 12, the bearings being detachable to permit axial insertion and withdrawal of the shaft 16 to and from the housing. A gear 22 detachably fixed to the shaft 16, adjacent to but outside of or beyond the bearing 19, meshes with a driving pinion 23 detachably fixed to the adjacent projecting end of the shaft 17.

The shaft 17 is similarly journalled in appropriate longitudinally spaced bearings 24 and 25 respectively fixed in the housing walls 11 and 12 in a manner to permit axial insertion and removal of the shaft 17 to and from the housing. That end 26 of the shaft 17 opposite the pinion 23 projects through the housing wall 11 and is equipped to receive a driving pulley (not shown) or the like through which it is connectable to a power source.

It will thus be noted that the speed reducer of Fig. 1 provides a single stage of speed reduction between the drive shaft 17 and driven hollow shaft 16 through the pinion 23 and gear 22, both of the latter being removable from their respective shafts and replaceable by gears of other sizes to change the speed ratio of the speed reducer. A sheet metal cover plate 27 removably attached to a peripheral flange extension 28 of the housing 10 provides an effective enclosure for the pinion 23 and gear 22 readily accessible for the purpose of changing gears.

Figure 2:
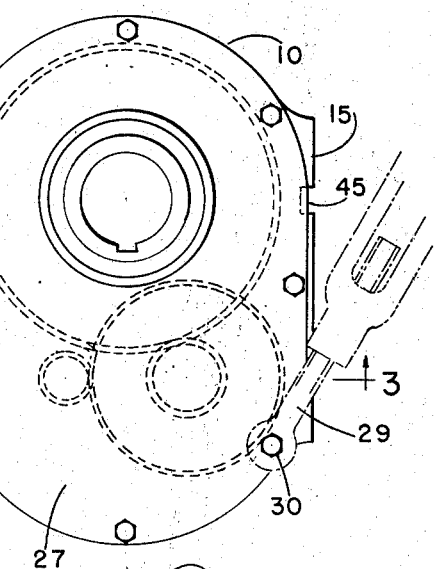
Fig. 2 is a view in front elevation of the speed reducer shown in Fig. 1, equipped with a double reduction gear train.

Any appropriate means, such as the lengthwise adjustable link 29 shown in broken lines in Fig. 2, may be employed to sustain the torque commonly imposed on the housing 10 during normal operation. One end of the link 29 is preferably bolted or otherwise attached, as at 30, to the lower end of the housing 10 preferably at that side thereof toward the driven mechanism, the other end of the link being similarly anchored in a well known manner to a stationary part of the driven mechanism so as to fix the housing 10 in any desired position of rotative adjustment about the axis of the supporting shaft 16.

Figure 3:
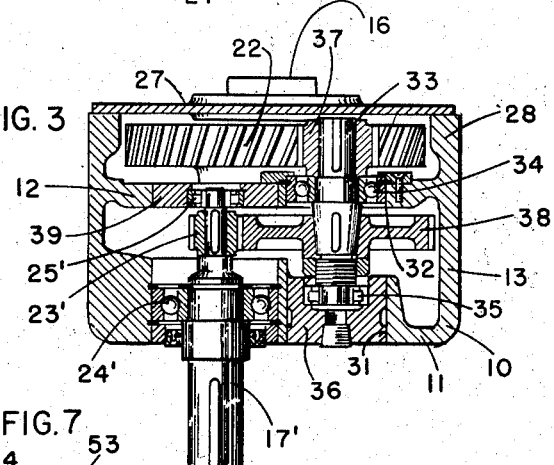
Fig. 3 is a transverse sectional view taken substantially along the line 3—3 of Fig. 2.

As indicated in Figs. 2 and 3, the housing 10 is designed to permit the use of additional gearing for the purpose of providing two stages of speed reduction between the driving and driven shafts. For this purpose additional coaxial bores 31 and 32 are provided in the housing walls 11 and 12, respectively, and a counter shaft 33 is provided, journalled at one end in a bearing 34 detachably seated in the bore 32, and also journalled at its other end in a bearing 35 detachably seated in a plug 36 removably fixed in the other bore 31. The counter shaft 33 extends through the wall 12 and a pinion 37 on the projecting end thereof meshes with the gear 22 on the hollow shaft 16. A gear 38, fixed to the counter shaft 33 between the bearings 34 and 35, meshes with a pinion 23' on a drive shaft 17'. In this instance the drive shaft 17' is journalled intermediate its ends in a bearing 24' removably fixed in the housing wall 11 and at its inner end in a bearing 25' seated in a bushing 39 removably fixed in the housing wall 12, the pinion 23' being removably attached to the shaft 17' between the bearings 24' and 25'. It will be noted that the pinion 23' and gear 38 provide one stage of speed reduction while the pinion 37 and gear 22 provides a second reduction stage between the driving shaft 17' and driven shaft 16.

It will of course be understood that when an anchor link, such as indicated at 29, is employed to sustain the torque reaction load on the housing 10, this link reacts through the housing to impose on the shaft S a transverse thrust equal and opposite to that sustained by the link.

Such a thrust is objectionable particularly when added to the transverse thrust imposed on the shaft S by the pull of the belt in those installations wherein the shaft 17 is belt driven. Such thrusts are eliminated by the use of the novel mechanism shown in Figs. 4 and 5 which is designed to sustain the torque reaction load, as well as the belt pull, quite independently of the shaft S.

Figure 4:
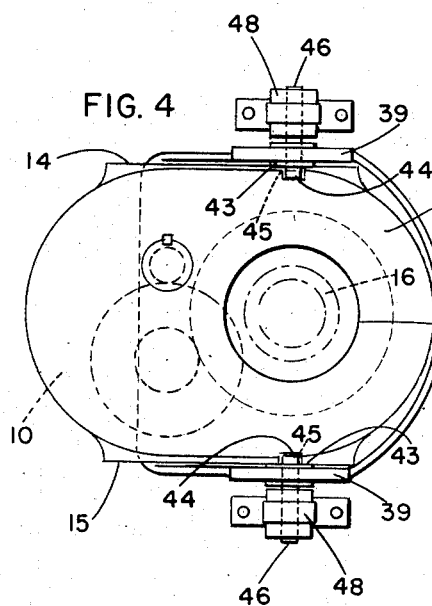
Figs. 4 and 5 are views in front and side elevation, respectively, of the speed reducer shown in Fig. 2, but equipped with a modified form of torque sustaining device.
Figure 5:
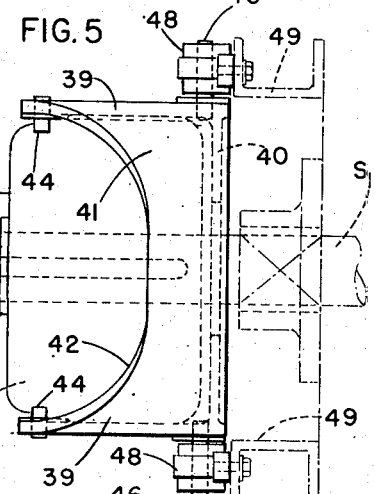

Although this might be accomplished in various ways, the mechanism shown in Figs. 4 and 5 has proven satisfactory. This mechanism comprises a structural unit having a pair of substantially parallel arms 39 rigidly interconnected by an integral base plate 40 and braced by an arcuate web 41 joined to the base plate and to the arms at one side of the latter. The web 41 is preferably partially cut away, as at 42, to conserve weight, and the base plate 40 is preferably extended somewhat beyond the arms 39 at the other side thereof for purposes of stability. The spacing of the arms 39 is such as to freely admit an end of the speed reducer housing 10 therebetween with the longitudinally extending side pads 14 and 15 thereof in rather close contact with circular pads 43 formed on the inner or opposed faces of the arms. Inwardly directed aligned pins 44, removably anchored in the pads 43 centrally thereof, engage slots 45 formed in and extending transversely of the housing pads 14 and 15. A pair of oppositely directed aligned trunnions 46, fixed in and projecting outwardly from the base of the unit in substantially parallel relation to the pins 44, provide a pivotal support therefor. In this instance the trunnions 46 are shown journalled in suitable pillow blocks 48 rigidly attached to a stationary part of the driven mechanism through appropriate brackets 49. The base plate 40 is provided with an opening 50 of a size to freely accommodate the projecting end of the hollow shaft 16 of the speed reducer as well as the shaft S of the driven mechanism.

When employing the torque sustaining unit just described, it is first applied to a stationary part of the driven mechanism by first engaging the trunnions 46 in the pillow blocks 48 and then fixing the latter to the mounting brackets 49, the latter being arranged to position the opening 50 of the unit substantially coaxially with the shaft S, and the pillow blocks 48 preferably positioned to permit a limited free play of the unit in a direction lengthwise of the trunnions 46. The housing 10 is then inserted between the arms 39 of the unit with the pins 44 engaged in the slots 45, the hollow shaft 16 being passed over the shaft S and keyed thereto. It will be noted that the limited free play of the unit lengthwise of the trunnions 46, together with a limited swinging action of the arms 39 about the axis of the trunnions 46, permits the housing 10 to freely follow any undulations of the shaft S that may occur as a result of any eccentricity thereof relative to its axis of rotation.

When thus applied, the housing 10 is securely held against rotation by the engagement of the pins 44 in the housing sockets 45, all torque reactions imposed on the housing 10 being transmitted through the pins 44, arms 39, and trunnions 46 to the stationary pillow blocks 48. It will be noted that, by reason of the free tiltability of the unit about the axis of the trunnions 46, all torque transmitted from the housing 10 to the pins 44 is equally divided between the latter, so that this torque is fully sustained without imposing any thrust on the shaft S. Moreover, if the drive shaft 17 or 17' of the speed reducer be belt driven by belting arranged so that the belt pull is substantially parallel to the axis of the trunnions 46, the latter will sustain the belt pull independently of the shaft S.

Figures 6, 7:
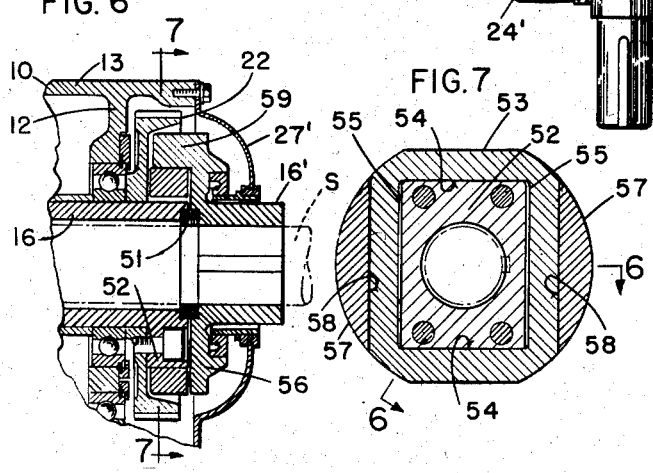
Fig. 6 is a fragmentary sectional view of the speed reducer of Fig. 2 modified to insure elimination of objectional wabbling. This view is taken substantially along the line 6—6 of Fig. 7.
Fig. 7 is a sectional view of a flexible coupling employed in the device of Fig. 6, taken substantially along the line 7—7 of Fig. 6.

The speed reducer shown in Figs. 6 and 7 is similar to that of Figs. 1, 2 and 3 except that a flexible coupling has been added permitting it to be structurally divorced from the shaft S of the driven mechanism. In this instance the internal diameter of the shaft 16 is somewhat larger than the shaft S of the driven mechanism and an extension shaft 16' has been added to fit onto the shaft S and to be keyed or otherwise fixed thereto. The extension shaft 16' is separate from the shaft 16, the adjacent ends thereof being recessed to receive an appropriate flexible oil retainer packing 51 therebetween. In this instance the extension shaft 16' constitutes the hub of a suitable flexible coupling preferably such as will now be described.

The flexible coupling shown includes a rectangular driving head 52 carried by the outer end of the shaft 16 and to which the gear 22 is bolted or otherwise attached. A substantially flat rectangular frame 53 encircles the head 52 with a pair of opposed parallel internal faces 54 thereof in close sliding contact with corresponding faces on the head. Clearances 55 between the head 54 and the other internal faces of the frame 53 permit a limited relative displacement between the head and frame in a direction parallel to the faces 54 and also a limited tilting action therebetween about an axis normal to the faces 54. A driving flange 56 on the inner end of the extension shaft 16' carries a pair of rigid jaws 57 spaced apart to receive the frame 53 therebetween and having opposed parallel faces 58 disposed normal to the faces 54 and in close sliding contact with corresponding external faces on the frame 53. Free relative displacement is thus permitted between the jaws 57 and frame 53 in a direction parallel to the faces 58. Combined with the jaws 57 and head 52 in the manner just described, the frame 53 thus provides an intermediate positive torque transmitting connection between the shafts 16 and 16', a connection sufficiently flexible to accommodate a substantial degree both parallel and angular misalignment between those shafts. The cover plate 27' is in this instance dished or otherwise fashioned to accommodate the added parts above described.

The provision of a flexible coupling, such for instance as above described, makes it possible to rigidly mount the speed reducer quite independently of the shaft S, without imposing on the gearing or shafting thereof objectionable stresses that might otherwise result from lack of trueness in the shaft S. Various means for thus mounting the speed reducer are illustrated in Figs. 8 to 11.

Figure 8:
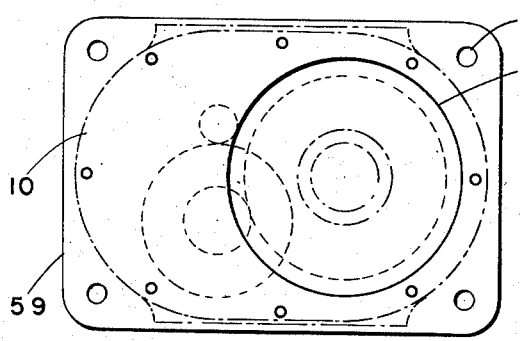
Figs. 8, 9, 10 and 11 are elevational views illustrating various means for mounting the speed reducer of Fig. 7.
Figure 9:
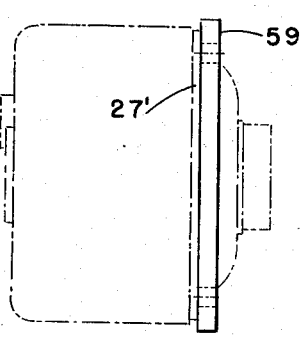

In Figs. 8 and 9 a mounting plate 59 is shown adapted for application to that face of the housing 10 on which the cover 27' is mounted. This plate 59 may be secured to the housing by the same bolts or screws that secure the cover 27' thereto, and it is shown perforated at 60 for that purpose. An opening 61 is provided therein to accommodate the dished portion of the cover 27', and corner holes 62 are provided through which the plate 59 may be bolted or otherwise rigidly secured to appropriate stationary brackets (not shown).

Figure 10:
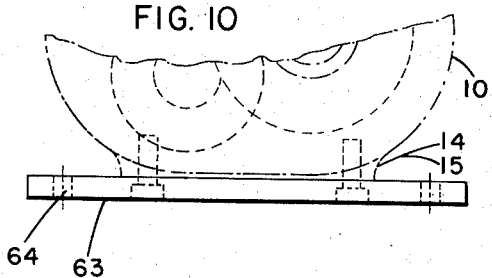
Figure 11:
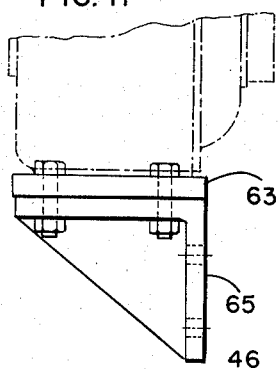

A somewhat similar mounting plate 63 is shown in Figs. 10 and 11 adapted for attachment to one side of the housing. In this instance the plate 63 is shown bolted to one of the longitudinally extended mounting pads 14 or 15 formed on the sides of the housing 10 in the manner hereinabove described. Like the plate 59, this plate 63 is provided with corner holes 64 through which it may be bolted or otherwise attached to a suitable stationary mounting bracket such as shown for instance at 65.

It will of course be understood that either of the plates 59 or 63 may be employed as a means for stationarily mounting the speed reducer on a floor or upright or overhead support quite independently of the driven mechanism, or on the housing or frame or other stationary part of the driven mechanism, dependent upon the conditions encountered in any given installation.

Various changes may be made in any of the embodiments of the invention hereinabove specifically described without departing from or sacrificing the advantages of the invention as defined in the appended claims.

I claim:

1. In a speed reducer the combination of a housing having a pair of laterally spaced substantially parallel walls integrally connected to form a rigid structure, a driven shaft journalled in both of said walls and having a hollow portion adapted to receive the power input shaft of mechanism to be driven thereby, a drive shaft journalled in both of said walls in laterally offset parallel relation to said driven shaft, said drive shaft extending beyond said housing for connection with a power source, a counter shaft journalled in both of said walls in offset parallel relation to said drive and driven shafts, speed reduction gearing carried by and connecting said shafts in driving relation, said gearing including gears disposed at opposite sides of one of said walls, and means engaged with said housing for sustaining the torque load imposed thereon by said gearing.

2. In a speed reducer the combination of a housing, a driven shaft journalled therein and having a hollow portion adapted to receive the end of a power input shaft of a driven mechanism to drive the same, a drive shaft journalled in said housing and having an end projecting beyond said housing for connection with a power source, speed reduction gearing connecting said shafts in driving relation and imposing a torque load on said housing, a unit flexibly engaged with said housing at opposite sides of said driven shaft for sustaining the torque load imposed on said housing, and stationary means flexibly engaged with said unit for sustaining the torque load transmitted thereto from said housing.

3. In a speed reducer the combination of a housing, a driven shaft journalled therein and having a hollow portion adapted to receive the end of a power input shaft of a driven mechanism to drive the same, a drive shaft journalled in said housing, gearing connecting said shafts in driving relation and imposing a torque load on said housing, and means for sustaining the torque load on said housing, said means including elements engaged with said housing at opposite sides of said driven shaft, and flexible means reacting to the torque load on said housing for distributing said torque load between said elements.

4. In a speed reducer the combination of a housing, a driven shaft journalled therein and having a hollow portion adapted to receive the end of a power input shaft of a driven mechanism to drive the same and to provide support for said housing, a drive shaft journalled in said housing, gearing connecting said drive and driven shafts in driving relation and imposing a torque load on said housing, and means including a unit engageable with opposite sides of said housing to sustain the torque load thereon without imposing a radial load on said power input shaft.

5. In a speed reducer the combination of a housing, a driven shaft journalled therein and having a hollow portion adapted to receive the end of the power input shaft of a driven mechanism, a drive shaft journalled in said housing, speed reduction gearing connecting said drive shaft and said driven shaft in driving relation, and a flexible driving connection between said driven shaft and said power input shaft.

6. In a speed reducer the combination of a housing, a driven shaft journalled therein and having a hollow portion adapted to loosely receive the end of the power input shaft of a driven mechanism, a drive shaft journalled in said housing, a flexible coupling driven by the hollow portion of said driven shaft, and means for attaching said flexible coupling in driving relation with said power input shaft.

References Cited in the file of this patent
UNITED STATES PATENTS

| | | |
|---|---|---|
| 1,401,662 | Wilkinson | Dec. 27, 1921 |
| 1,921,296 | Harkness | Aug. 8, 1933 |
| 2,108,367 | Christian | Feb. 15, 1938 |
| 2,116,166 | Christian | May 3, 1938 |
| 2,554,969 | Williams | May 29, 1951 |
| 2,606,453 | Firth | Aug. 12, 1952 |
| 2,655,818 | Bodle | Oct. 20, 1953 |